(12) United States Patent
Pomerleau

(10) Patent No.: US 9,957,892 B2
(45) Date of Patent: May 1, 2018

(54) JET TURBINE UTILIZING A CRYOGENIC FUEL

(71) Applicant: Daniel Pomerleau, Calgary (CA)

(72) Inventor: Daniel Pomerleau, Calgary (CA)

( * ) Notice: Subject to any disclaimer, the term of this patent is extended or adjusted under 35 U.S.C. 154(b) by 671 days.

(21) Appl. No.: 14/409,490

(22) PCT Filed: Jun. 14, 2013

(86) PCT No.: PCT/CA2013/000581
§ 371 (c)(1),
(2) Date: Dec. 19, 2014

(87) PCT Pub. No.: WO2013/188956
PCT Pub. Date: Dec. 27, 2013

(65) Prior Publication Data
US 2015/0322891 A1 Nov. 12, 2015

Related U.S. Application Data

(60) Provisional application No. 61/661,940, filed on Jun. 20, 2012.

(51) Int. Cl.
| | |
|---|---|
| *F02C 7/141* | (2006.01) |
| *F02C 3/04* | (2006.01) |
| *F23R 3/28* | (2006.01) |
| *F23R 3/30* | (2006.01) |
| *F02C 9/40* | (2006.01) |
| *F02K 9/42* | (2006.01) |
| *F02C 3/22* | (2006.01) |

(52) U.S. Cl.
CPC ............. *F02C 7/141* (2013.01); *F02C 3/04* (2013.01); *F02C 9/40* (2013.01); *F23R 3/286* (2013.01); *F23R 3/30* (2013.01); *F02C 3/22* (2013.01); *F02K 9/42* (2013.01)

(58) Field of Classification Search
CPC ........ F02C 3/04; F02C 3/22; F02C 9/40; F02C 7/141; F02K 9/42; F23R 3/30
See application file for complete search history.

(56) References Cited

U.S. PATENT DOCUMENTS

| | | | | |
|---|---|---|---|---|
| 3,046,742 A | * | 7/1962 | Egbert ................. | F23R 3/20 60/246 |
| 3,740,949 A | * | 6/1973 | Wolf ................... | F02C 7/08 60/267 |

(Continued)

FOREIGN PATENT DOCUMENTS

| | | |
|---|---|---|
| JP | 2000008955 A | 1/2000 |
| WO | 2012045034 A2 | 4/2012 |

(Continued)

OTHER PUBLICATIONS

Knowlen C et al., "Quasi-Isothermal Expansion Engines for Liquid Nitrogen Automotive Propulsion," SAE Technical Paper 972649, 1997, doi:10.4271/972649, 8pp.

(Continued)

*Primary Examiner* — Lorne Meade
(74) *Attorney, Agent, or Firm* — Franklin & Associates International Inc.; Matthew F. Lambrinos

(57) ABSTRACT

The invention relates to systems enabling the use of cryogenic fuels within combustion engines, including jet engines.

10 Claims, 2 Drawing Sheets

(56) References Cited

U.S. PATENT DOCUMENTS

| | | | | |
|---|---|---|---|---|
| 4,062,184 | A | * | 12/1977 | Hagen ........................ F02C 3/22 60/39.282 |
| 4,359,118 | A | | 11/1982 | Latter |
| 4,771,601 | A | * | 9/1988 | Spies ........................ F02K 7/18 60/259 |
| 5,052,176 | A | | 10/1991 | Labatut et al. |
| 5,924,307 | A | * | 7/1999 | Nenov .................... F01D 15/12 62/643 |
| 6,385,959 | B1 | | 5/2002 | Montoya |
| 8,192,511 | B2 | | 6/2012 | Wei |
| 8,430,360 | B2 | * | 4/2013 | Schwarze ................. F02C 9/40 244/135 C |
| 2009/0320476 | A1 | | 12/2009 | Ding et al. |
| 2010/0005801 | A1 | | 1/2010 | Negre et al. |
| 2013/0186059 | A1 | * | 7/2013 | Epstein .................... F02C 3/22 60/205 |
| 2013/0192246 | A1 | * | 8/2013 | Kamath ................. F02C 7/228 60/776 |

FOREIGN PATENT DOCUMENTS

| | | | | |
|---|---|---|---|---|
| WO | WO2012/045029 A1 | * | 4/2012 | ................ F02C 9/40 |
| WO | 2013188956 A1 | | 12/2013 | |

OTHER PUBLICATIONS

International Search Report dated Sep. 10, 2013 in International Patent Application No. PCT/CA13/00581, 4pp.

Written Opinion of the International Searching Authority, dated Sep. 10, 2013 in International Patent Application No. PCT/CA13/00581, 5pp.

* cited by examiner

JET TURBINE UTILIZING A CRYOGENIC FUEL

CROSS REFERENCE TO RELATED APPLICATIONS

This application is the National Stage of International PCT Application No. PCT/CA2013/000581, filed Jun. 14, 2013, which claims the benefit under 35 U.S.C. § 119(e) of U.S. Provisional Patent Application No. 61/661,940, filed Jun. 20, 2012.

FIELD OF THE INVENTION

The invention relates to systems enabling the use of cryogenic fuels within combustion engines, including jet engines.

BACKGROUND OF THE INVENTION

As is well known, natural gas is a plentiful and relatively inexpensive energy product. It is widely used in a large number of industries including power generation, home heating, transportation, fertilizers, hydrogen generation as well as in the manufacture of many products.

To date, the use natural gas in the transportation industry has been generally limited to compressed natural gas (CNG) that has been utilized within internal combustion engines (ICEs). In these applications, a compressed gas tank stores the natural gas and the natural gas is delivered to the chambers of the ICE primarily through the release of pressure from the gas tank. Generally, a CNG vehicle is advantaged over gasoline type vehicles by improved emissions quality; however a CNG is disadvantaged by the overall energy density of the CNG within a compression tank. In addition, there is also a general perception amongst the public that CNG as a fuel within a compression tank is substantially more dangerous than a liquid fuel in an un-pressurized tank due to the perceived potential for explosion with a compressed gas.

Liquid natural gas (LNG) as an energy source provides a number of advantages over CNG particularly in terms of energy density. More specifically, LNG has approximately 2.4 times the energy density of CNG. Advantageously, LNG also has an energy density on a mass basis approximately 50% higher than of gasoline. However, on a volumetric basis, the energy density of LNG is about 50% that of gasoline. As such, for a given mass of LNG, the LNG stores approximately 50% more energy in comparison to an equivalent weight of gasoline.

Thus, as a form of vehicular energy, notwithstanding the volumetric disadvantage of LNG compared to gasoline, LNG is attractive as a vehicular fuel as it contains approximately 50% more energy than gasoline on a weight basis.

Moreover, as a relatively pure product that does not require the level of refining of liquid petroleum products, natural gas and LNG are also very attractive from a cost perspective.

As is known, the economics of LNG as an energy sources are complex in that many factors go into the determination of an LNG price including the base price of the natural gas, the costs of the liquefaction process, transportation and storage costs as well as jurisdictionally imposed taxes. End product capital costs of the equipment using the LNG are also a factor in the final cost of delivering the LNG energy sources to the consumer. However, with the assumption that transportation costs are a small component of the price of LNG, and that many of above costs are comparable to gasoline, the cost of LNG to an equivalent volume of gasoline is approximately 50% of that of gasoline.

In addition to the cost and bulk energy considerations of LNG compared to gasoline, there are also performance considerations associated with the use of LNG within a combustion engine.

In particular, the cryogenic state of LNG has the potential to affect the performance of combustion engines by providing effective cooling within an engine. That is, as is well known, the performance of a combustion engine can be improved by increasing the density of the incoming combustion air. By way of example, intercoolers are used to effect a cooling of combustion air entering an internal combustion engine so as to improve the combustion processes within the engine.

Furthermore, by virtue of the energy required to effect liquefaction of natural gas to LNG, LNG effectively stores energy of vaporization which on conversion from liquid to gas may be used to perform useful work.

SUMMARY OF THE INVENTION

In accordance with the invention, there is provided a jet turbine having a plurality of compressor stages for compressing combustion gas and combusting a fuel, the jet turbine comprising: a cryogenic fuel injector/nozzle for injecting a cryogenic fuel into a cryogenic turbine section, the cryogenic turbine section enabling the vaporization of a cryogenic fuel; and a combustor downstream of the cryogenic fuel injector/nozzle and cryogenic turbine section for combusting vaporized cryogenic fuel wherein combusted cryogenic fuel expands through a combustor turbine operatively connected to upstream compressor stages.

BRIEF DESCRIPTION OF THE DRAWINGS

The invention is described with reference to the accompanying figures in which.

DETAILED DESCRIPTION OF THE INVENTION

With reference to the Figures, combustion engines utilizing cryogenic fuels are described. More specifically, the technology relates to systems and methods for using cryogenic fuels in combustion engines, including turbine engines. Generally, the engines operate as hybrids of their normal designs that utilize the energy of vaporization of cryogenic fuels as a work force within the engine as well as the combustion of vaporized gas. Importantly, the engines provide various efficiency advantages over other designs of engines by enabling the use of cryogenic fuels within a combustion engine. The engines enable the use of readily available fuels such as LNG which has a higher energy density and lower cost as compared to a liquid hydrocarbon such as gasoline, kerosene or diesel.

Jet Turbine

Figure 1:
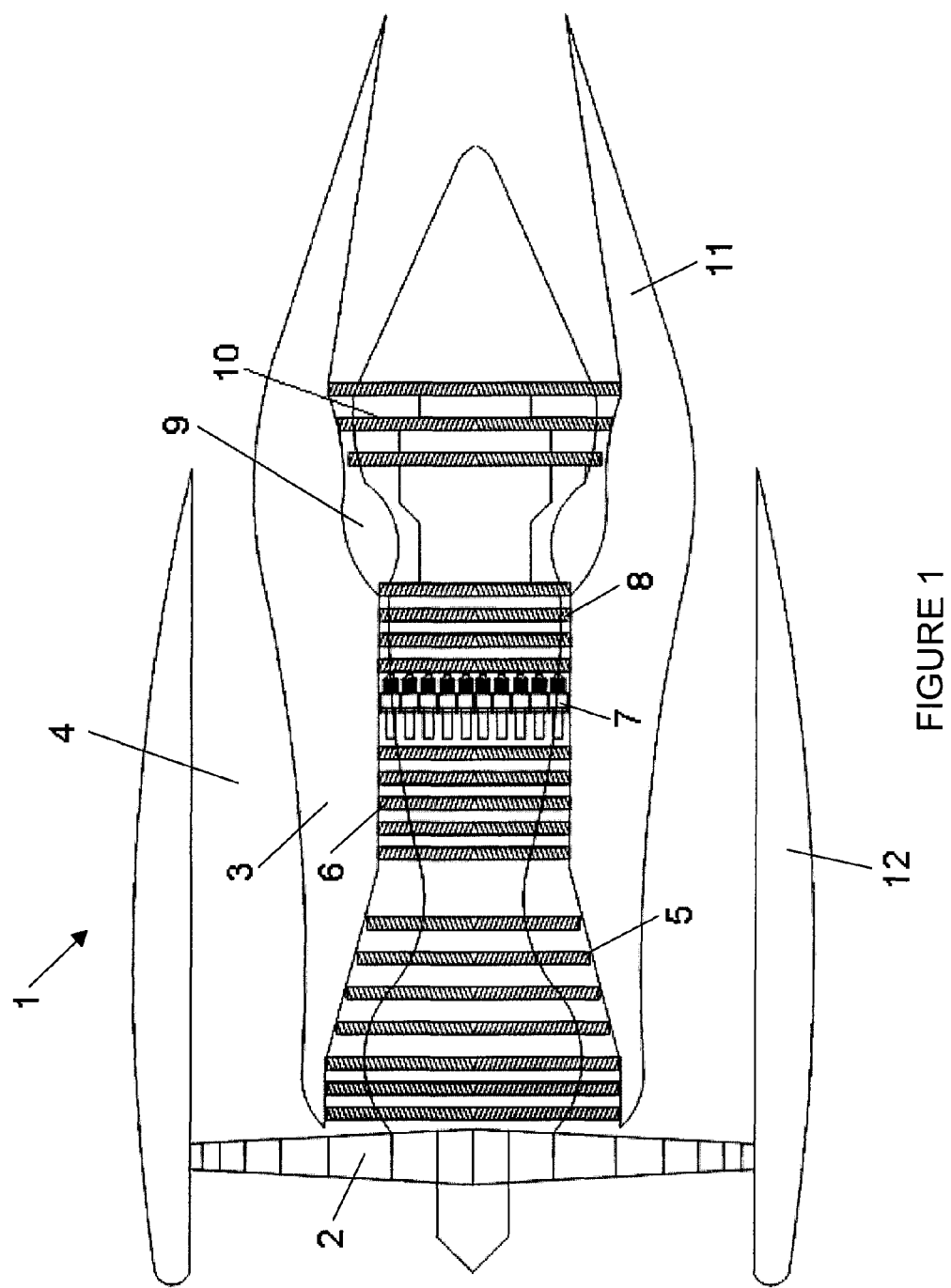
FIG. 1 is a schematic diagram of a turbine engine utilizing liquid natural gas as a fuel in accordance with one embodiment of the invention; and, FIG. 2 is a schematic diagram of a turbine engine utilizing liquid natural gas as a fuel showing the position of fuel injector/nozzles in accordance with one embodiment of the invention.
Figure 2:
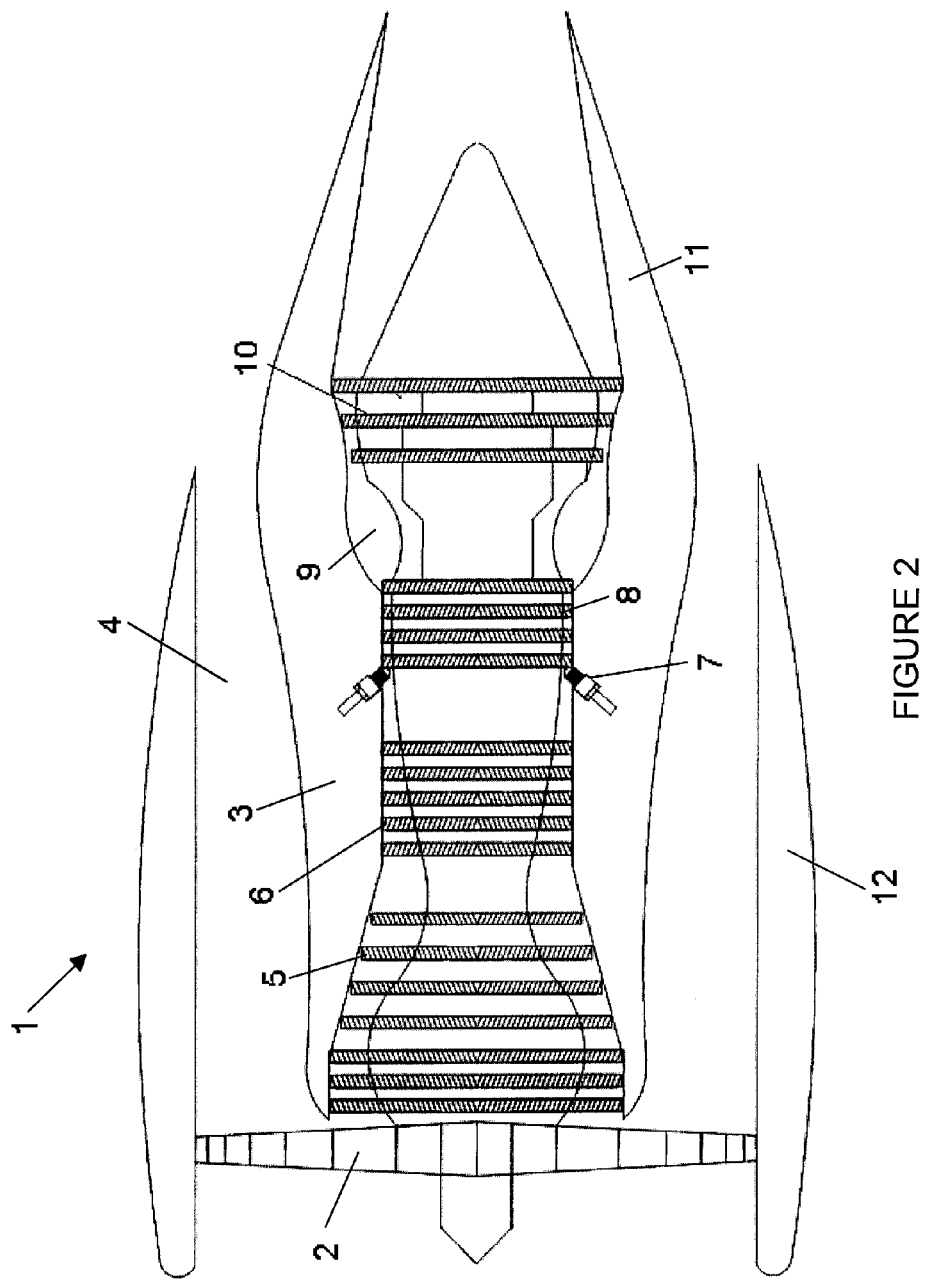

FIGS. 1-2 describe turbine engine embodiments in which a cryogenic combustible liquid gas (CCLG) is utilized. The turbine engine comprises a turbofan jet engine 1, a fan 2, an engine body 3, a fan nozzle 4, a low pressure compressor 5, a high pressure compressor 6, a cryogenic fluid injector/nozzle 7, a cryogenic turbine section 8, a combustor 9, a combustor turbine 10, an engine nacelle 12 and a core nozzle 11. FIGS. 1 and 2 show slightly different positions of the nozzles 7.

Generally, the cryogenic gas is injected into the engine prior to the combustor sequence. The liquefied gas expands in the cryogenic turbine section 8 as it mixes with incoming air received through fan 2 and low pressure compressor 5. The pressure of expansion is used to rotate turbine blades prior to combustion.

In addition, the cryogenic gas provides a cooling effect to the incoming combustion air that will increase the density of the combustion air prior to reaching the combustors 9 thus enhancing the combustion process.

Downstream of the injector/nozzles, the now vaporized gas is ignited in the combustor 9 wherein the energy of combustion is used to drive combustor turbine blades 10 as in a regular jet engine. The combination of vaporization of liquefied gas and combustion of vaporized gas produces thrust.

Importantly, by virtue of the cooling effects, the temperatures within the compressor stages may be lower, thereby enabling the construction of compressor stages with lower cost alloys.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A jet turbine utilizing a cryogenic fuel, said jet turbine comprising:
 a low pressure compressor and a high pressure compressor downstream of and operatively connected with said low pressure compressor, said low pressure compressor and said high pressure compressor having a configuration capable of compressing and supplying air;
 a cryogenic fuel injector section downstream of said high pressure compressor, said cryogenic fuel injector section having a configuration capable of receiving compressed air from said high pressure compressor, said cryogenic fuel injector section including a plurality of fuel injectors or nozzles having a configuration capable of injecting said cryogenic fuel into said compressed air;
 a cryogenic turbine section downstream of said cryogenic fuel injector section, said cryogenic turbine section having at least one cryogenic turbine, said cryogenic turbine section having a configuration capable of receiving and expanding said compressed air and said cryogenic fuel from said cryogenic fuel injector section;
 a combustor downstream of said cryogenic turbine section, said combustor having a configuration capable of receiving and combusting said compressed air and said cryogenic fuel from said cryogenic turbine section; and
 a combustor turbine section downstream of said combustor, said combustor turbine section having a configuration capable of receiving a combustion exhaust from said combustor, said combustor turbine section having at least one combustor turbine operatively connected with said low pressure compressor and said high pressure compressor.

2. The jet turbine of claim 1, wherein said cryogenic fuel is liquid natural gas.

3. The jet turbine of claim 1, wherein said cryogenic turbine is operatively connected with said low pressure compressor and said high pressure compressor.

4. The jet turbine of claim 1 further comprising a fan for receiving incoming air, said fan operatively connected to said cryogenic turbine.

5. The jet turbine of claim 4 further comprising an engine body including said low pressure compressor, said high pressure compressor, said cryogenic fuel injector section, said cryogenic turbine section, said combustor and said combustor turbine section.

6. The jet turbine of claim 5 further comprising an engine nacelle surrounding said fan and at least a portion of said engine body creating a bypass passage capable of directing a portion of said incoming air around an exterior of said engine body.

7. The jet turbine of claim 1, wherein said cryogenic turbine has a configuration capable of expanding said cryogenic fuel as it mixes with said compressed air.

8. The jet turbine of claim 1, wherein said cryogenic fuel is configured to provide a cooling effect to said compressed air and to increase a density of said compressed air prior to entering said combustor.

9. The jet turbine of claim 1, wherein said fuel injectors or nozzles are radially arranged with and parallel to a longitudinal axis of said cryogenic fuel injector section.

10. The jet turbine of claim 1, wherein said fuel injectors or nozzles are radially arranged with and angled to a longitudinal axis of said cryogenic fuel injector section.

* * * * *